United States Patent [19]

Sunami et al.

[11] Patent Number: 5,581,586
[45] Date of Patent: Dec. 3, 1996

[54] DRIVE DEVICE FOR CONTROL ROD DRIVE MECHANISMS

[75] Inventors: Yoshio Sunami, Kanagawa-ken; Takeshi Hasegawa, Tokyo, both of Japan

[73] Assignee: Kabushiki Kaisha Toshiba, Kawasaki, Japan

[21] Appl. No.: 319,722

[22] Filed: Oct. 7, 1994

[30] Foreign Application Priority Data

Nov. 12, 1993 [JP] Japan ................................ 5-283233

[51] Int. Cl.$^6$ ..................................... G21C 7/06
[52] U.S. Cl. .................. 376/228; 376/215; 376/242; 376/258; 376/259; 376/237
[58] Field of Search .................... 376/228, 215, 376/242, 258, 259, 237; 976/DIG. 138, DIG. 125, DIG. 128; 318/685, 696, 85, 102

[56] References Cited

U.S. PATENT DOCUMENTS

| | | | |
|---|---|---|---|
| 3,784,889 | 1/1974 | Michael | 318/171 |
| 3,864,615 | 2/1975 | Williams | 318/696 |
| 3,899,727 | 8/1975 | Thayer | 318/564 |
| 4,105,939 | 8/1978 | Culbertson | 318/599 |
| 4,584,165 | 4/1986 | Wilson et al. | 376/216 |
| 4,711,753 | 12/1987 | Impink, Jr. et al. | 376/216 |
| 5,075,594 | 12/1991 | Schumacher et al. | 315/111.21 |
| 5,287,264 | 2/1994 | Arita et al. | 364/184 |

FOREIGN PATENT DOCUMENTS 5-111110  4/1993  Japan .

*Primary Examiner*—Charles T. Jordan
*Assistant Examiner*—Meena Chelliah
*Attorney, Agent, or Firm*—Oblon, Spivak, McClelland, Maier & Neustadt, P.C.

[57] ABSTRACT

In a drive device of control rod drive mechanisms, a large number of control rod drive mechanisms are divided into a plurality of groups, and there are provided, for each group, a control rod changeover device, and an inverter power source and inverter controller constituting the drive power source. The drive device comprises a control unit that receives control rod position signals from each of the control rod drive mechanisms and that outputs control signals to the control rod changeover device and inverter controller, and a man-machine device constituting an interface with the operator, that outputs control rod drive information to this control unit.

13 Claims, 4 Drawing Sheets

DRIVE DEVICE FOR CONTROL ROD DRIVE MECHANISMS

BACKGROUND OF THE INVENTION

This invention relates to a drive device for control rod drive mechanisms using electric motor drive in an atomic power plant.

With the revolution in reactor control technology in recent years, for control rod drive mechanisms in atomic power plants, use has come to be made of control rod drive mechanisms in which the position of the control rod is controlled using an electric motor, rather than control rod drive mechanisms as conventionally employed, in which insertion and withdrawal operation was performed by water pressure.

In such control rod drive mechanisms, control of the direction of drive (insertion or withdrawal) of the control rod and/or the drive speed and position of the control rod can be effected by changing the voltage, frequency and drive time of the electric motor by operating switching elements in an inverter power source constituting the power source of the electric motor that drives the control rod.

However, since, in such a control rod drive mechanism, the electric motor is controlled using an inverter power source, techniques for suppressing the adverse effects of noise generated from this inverter power source have become necessary.

A conventional drive unit for a control rod drive mechanism comprises, as shown by the block diagram of FIG. 1, 205 control rod drive mechanisms 1, 205 inverter power sources 2 corresponding to the drive mechanisms, and 205 inverter controllers 3, as well as a control device 4 and a man-machine device 5.

The plurality of control rod drive mechanisms 1 installed at the bottom of the reactor of the atomic power plant deliver output to control unit 4 in the form of control rod position signals S1 that indicate the positions of the control rods, not shown, in the reactor.

When the control rods are driven, man-machine device 5 is used to select (1) a control rod selection mode (individual or ganged), (2) a control rod drive mode (step, notch, or continuous), or (3) a control rod insertion/withdrawal mode. The information regarding which selection has been made is output to control unit 4 in the form of drive information S2 indicating the target position obtained by calculation in accordance with the selection that was made.

(1) The control rod selection mode is the mode that selects which control rods within the reactor are to be driven, and may be specified as either individual mode or ganged mode. Of these, the individual mode is a mode that is employed for surveillance of the control rods. In this mode, the control rods can be driven one at a time.

Also, in the case where movement of the control rods is automated, the control rods are driven as groups of control rods comprising, for example, from 2 to a maximum of 26 control rods. This is called the ganged mode. When driving is effected by this ganged mode, up to a maximum of 26 inverter power sources 2 must be driven concurrently.

(2) The control rod drive mode is the mode for determining how the control rods are to be driven, and may be specified as a step mode, a notch mode or a continuous mode.

Step mode is a mode in which control rods are only driven through a fixed distance. This is employed when making fine adjustments, etc to the output of the reactor. The switching elements of inverter power sources 2 are turned ON or OFF so as to move control rod drive mechanisms 1 only through the width of the step.

Notch mode is a mode in which driving is effected through a distance of four times the step. The switching elements of the inverter power sources 2 are turned ON and OFF so as to move the control rod drive mechanisms 1 through four times the step width.

Continuous mode is a mode in which the control rods are driven continuously up to a target position that is input through man-machine device 5. Inverter power sources 2 output voltage continuously until the control rods reach the target position, whereupon their operation is stopped.

(3) Control rod insertion/withdrawal mode is the mode for specifying whether the control rods are to be inserted or withdrawn. The switching elements of inverter power sources 2 are turned ON and OFF to give output voltages of opposite phase for insertion and withdrawal.

In accordance with the control rod selection mode specified in the drive information S2 that is input from man-machine device 5, control unit 4 outputs the data of the control rod drive mode and control rod insertion/withdrawal mode as an inverter control signal S3 supplied to inverter controller 3 of the control rod drive mechanism 1 that effects drive.

Also, depending on the control rod current-position signal S1 from the control rod drive mechanism 1 that is being driven and in the control rod drive mode, the target position to be reached by the control rod drive mechanism 1 that is driving the control rod is calculated, and the output of inverter control signal S3 is continued until the control rod drive mechanism 1 reaches this target position.

Inverter controller 3 determines the direction of rotation of the motor in accordance with the control rod insertion/withdrawal mode of inverter control signal S3 that is input from control unit 4. Also, inverter controller 3 determines the motor drive time and voltage and frequency that are output by inverter power source 2 according to the control rod drive mode and outputs to inverter drive source 2 as inverter drive signal S4 the changeover timing information of the switching elements in the output unit of inverter power source 2.

Inverter power source 2 supplies the power specified by control rod drive mechanism drive signal S5, in accordance with the control rod drive mode and the control rod insertion/withdrawal mode contained in drive information S2, to control rod drive mechanism 1 under the control of inverter drive signal S4 from inverter controller 3.

Control rod drive mechanism 1 is fed with power from inverter power source 2, and the control rods are driven as long as this power is supplied.

However, when reactor scram occurs, the control rods in control rod drive mechanisms 1 are temporarily separated from the motors and inserted at high speed by water pressure, in response to a full-insertion drive command from the reactor emergency shut-down system.

As a backup system after the control rods of control rod drive mechanisms 1 have been fully inserted by water pressure, all 205 control rod drive mechanisms 1 are driven to a fully inserted position by operation of the electric motors in response to said full-insertion drive command.

Since one inverter power source 2 is provided for each control rod drive mechanism 1, when there are 205 inverter power sources 2, an enormous number of control rod drive devices, i.e., inverter power source 2, and inverter controllers 3, of control rod drive mechanisms 1 are required.

Also, in drive control of the control rods, even in the case of automatic control during reactor operation using a computer, the maximum number of ganged groups which can be operated without driving a plurality of control rods at the same time is 26. Furthermore, in emergency insertion such as reactor scram, the control rods are inserted by a water pressure unit, so there is no need for the motor drive using inverter power sources 2 to be able to actuate all the control rods urgently and simultaneously.

For the above two reasons, the provision of one inverter power source 2 for each control rod drive mechanism 1 means that a large number of inverter power sources 2 are required and inverter power sources 2 generate a lot of noise. A further problem is that equipment cost is increased by the fact that the devices and wiring etc. are complicated, so that a lot of maintenance is required.

SUMMARY OF THE INVENTION

An object of this invention is to provide a drive device for control rod drive mechanisms which overcomes the above described deficiencies of the conventional drive unit.

In order to achieve the above and other objects, there is provided a drive device for control rod drive mechanisms of an atomic power plant operated by electric motor drive, the device comprising: a control rod changeover device provided for each group of control rod drive mechanisms which are divided into a plurality of groups; an inverter power source which is constituted a drive power source of said electric motor drive; an inverter controller which outputs an inverter drive signal to said inverter power source; a control device which inputs control rod position signals from each of said control rod drive mechanisms and which outputs control signals to said control rod changeover device and inverter controller; and a man-machine device which is constituted an interface with an operator, the device outputting control rod drive information to said control device.

BRIEF DESCRIPTION OF THE DRAWINGS

A more complete appreciation of the present invention and many of its attendant advantages will be readily obtained by reference to the following detailed description when considered in connection with the accompanying drawings, in which.

DESCRIPTION OF THE PREFERRED EMBODIMENTS

Figure 1:
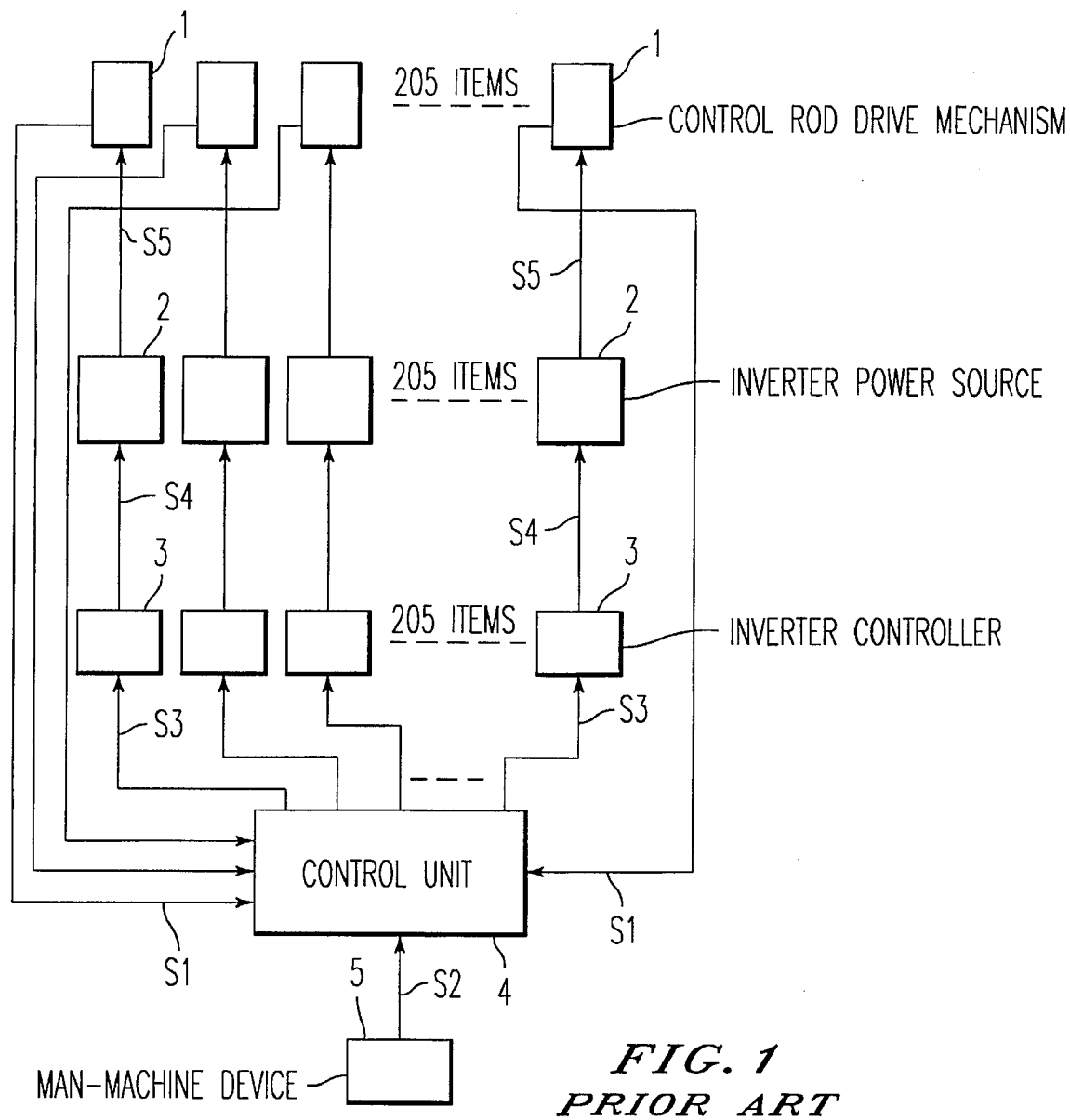
FIG. 1 is a block diagram of the drive device of a prior art control rod drive mechanism.

A first embodiment of this invention will now be described with reference to the drawings. Structural items which are the same as in the prior art described above are given the same reference numerals and further detailed description is omitted.

Figure 2:
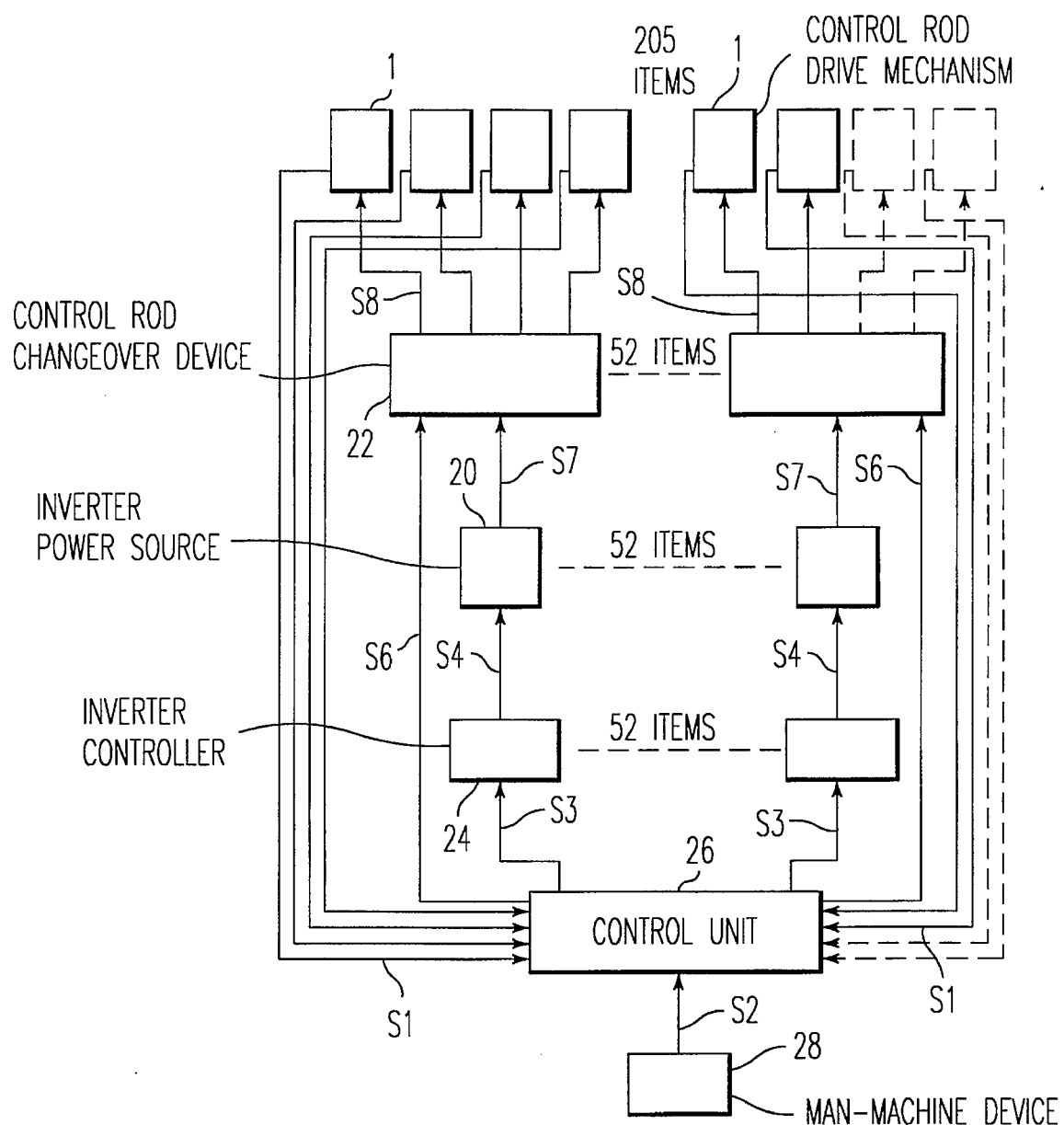
FIG. 2 is a block diagram of a drive device of a control rod drive mechanism constituting an embodiment of this invention.

As shown by the block diagram of FIG. 2, the 205 control rod drive mechanisms 1 that drive the 205 control rods, not shown, are combined in groups of four mechanisms apiece, a single inverter power source 20 being provided for each group of four control rod drive mechanisms 1.

In more detail, the arrangement is constituted by 52 control rod changeover devices 22 that select the control rod drive mechanisms 1 to be driven, from the 205 control rod drive mechanisms 1, coupled to the 205 control rods, not shown; 52 inverter power sources 20 constituting drive power sources of the electric motors in control rod drive mechanisms 1; and 52 inverter controllers 24 that control the inverter power sources 20; as well as a control unit 26 and man-machine device 28 which serves as an interface with a human operator.

Each inverter power source 20 is coupled to receive power from a conventional plant power source or a standby power source.

Also, the current control rod position is input from each control rod drive mechanism 1 to control unit 26 as a control rod position signal S1, and drive information S2 is output from man-machine device 28. Furthermore, control unit 26 outputs to inverter controller 24 an inverter control signal S3 and, to control rod changeover device 22, a selected control rod signal S6.

The changeover timing information of the switching elements in the output unit of the inverter power sources 20 is output from inverter controller 24 as inverter drive signal S4. Inverter power unit 20 outputs its inverter output S7 to control rod changeover device 22.

Control rod changeover device 22 is constructed such that the control rods, not shown, are driven by the control rod drive mechanisms 1 in response to output of a selected control rod drive mechanism drive signal S8 to the selected control rod drive mechanism 1 in response to changing over of the inverter output S7 through an electrical switching device included in changeover device 22 in accordance with the selected control rod signal S6. For example, control rod changeover device 22 can comprise a plurality of separately controllable electrical switches, such as mechanical or solid-state switching devices, for selectively coupling the inverter output S7 to one of the control rod drive mechanism associated therewith.

Operation of the above construction will now be described. As shown in FIG. 2, control unit 26 receives from man-machine device 28 (1) control rod selection mode, (2) control rod drive mode, or (3) control rod insertion/withdrawal mode, and drive information S2 of the target position calculated from these three modes. It also continually receives from the 205 control rod drive mechanisms 1 control rod position signals S1 that indicate where the control rod drive mechanisms S1 are stopped, i.e., at what part of the reactor core the control rod is stopped.

Figure 3:
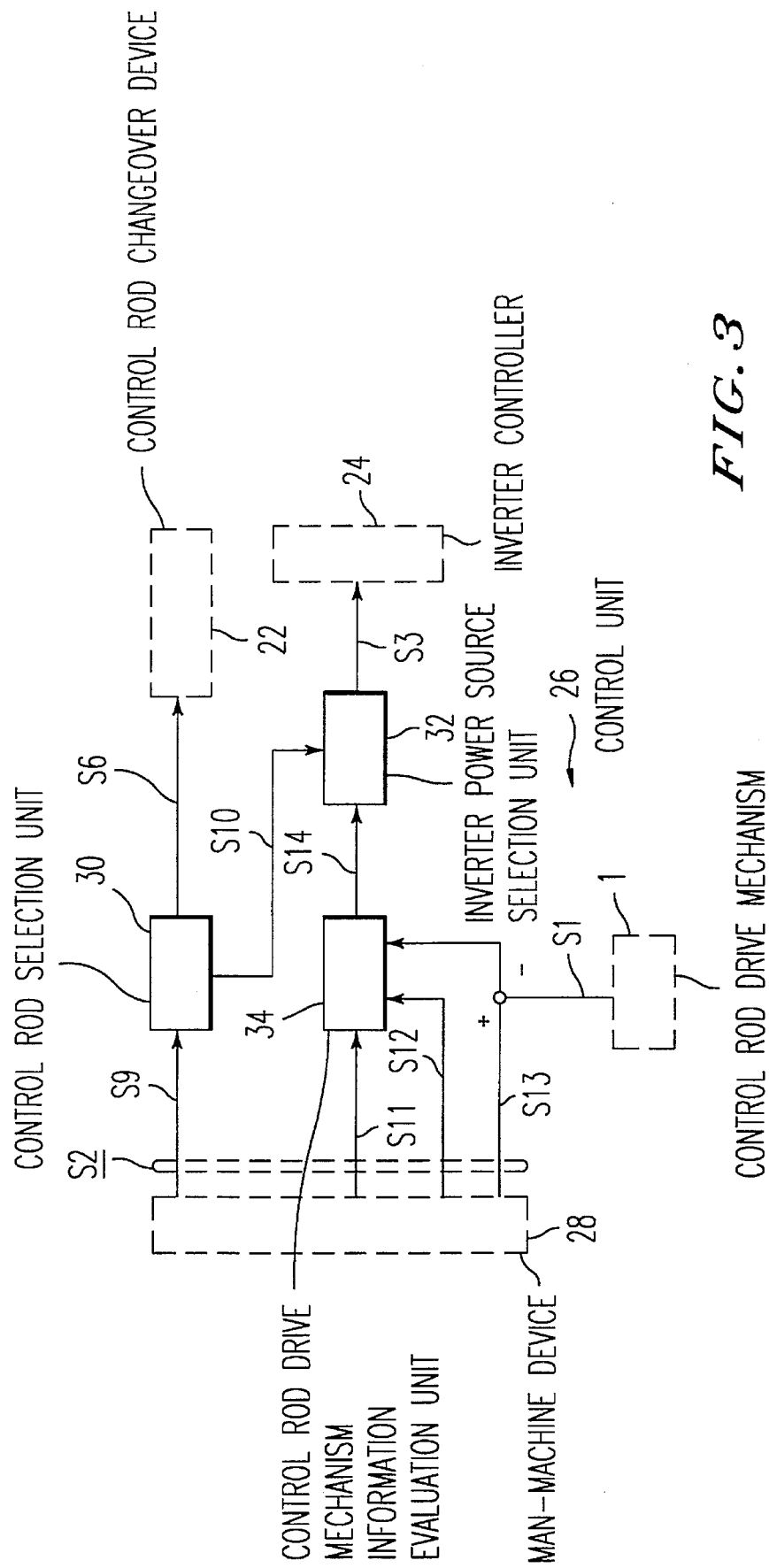
FIG. 3 is a block diagram of a control device of an embodiment of this invention.

As shown by the block diagram of FIG. 3, control unit 26 includes: a drive control rod selection unit 30, an inverter power source selection unit 32, and a control rod drive mechanism drive information evaluation unit 34, and executes the following control in response to control rod position signal S1 from the control rod drive mechanism 1 and drive information S2 from man-machine device 28.

A selected mode signal (single mode or ganged mode) S9 included in drive information S2 is input to drive control rod selection unit 30. When this identifies the number of the control rod changeover device 22 that drives the selected control rod drive mechanism 1, it outputs this information, as selected control rod signal S6, to the control rod changeover device 22 corresponding to the selected control rod drive mechanism 1.

Control rod changeover device 22 switches to the selected control rod drive mechanism 1. Simultaneously, drive control rod selection unit 30 outputs to inverter power source selection unit 32 a control rod changeover device signal S10 that controls the appropriate inverter controller 24 to control the associated inverter power source 20 to provide power for the control rod drive mechanism 1 that is driven.

Also, drive mode signal S11 (step, notch or continuous) included in drive information S2, insertion/withdrawal command signal S12, and target position signal S13 are input to control rod drive mechanism drive information evaluation unit 34. This control rod drive mechanism drive information evaluation unit 34 generates an inverter operating signal S14, which continues output of the control rod drive mode (step, notch or continuous), and insertion/withdrawal command (control rod drive mechanism rotation direction) of inverter power source 20 to inverter power source selection unit 32 until the control rod position signal S1 of the control rod drive mechanism 1 in question has reached the target position.

Inverter power source selection unit 32 selects an inverter power source 20 to be driven in accordance with the number of the control rod changeover device 22 of the control rod drive mechanism 1 to be driven, which is received in the form of control rod changeover device signal S10 from the drive control rod selection unit 30. Unit 32 also outputs the input inverter operating signal S14 received from control rod drive mechanism drive information evaluation unit 34, in the form of an inverter control signal S3, to the inverter controller 24 of the corresponding inverter power source 20.

Continuing the description of the various signals that are output by control unit 26 with reference to FIG. 2, the inverter controllers 24 are driven to output inverter drive signals S4 to inverter power units 20 by means of inverter control signal S3, which is output from control unit 26. The inverter output S7 that is output from the inverter power source 20 that is driven is supplied to the corresponding control rod changeover device 22.

With reference to control rod changeover device 22, a switch within control rod changeover device 22 corresponding to the control rod drive mechanism 1 that is to be driven is selected and closed in response to the selected control rod signal S6 that is output from control unit 26. Inverter output S7 that is output from the inverter power source 20 is thereby supplied, as selected control rod drive mechanism drive signal S8, only to the control rod drive mechanism 1 that is selected by man-machine device 28, thereby driving this control rod drive mechanism 1.

It should be noted that, in this invention, when the control rods are operated in a ganged group, the load capacity of a single inverter power source 20 is that of a single control rod drive mechanism 1. Even if 26 control rods, which is the maximum in a ganged group in the present embodiment, are operated simultaneously, there is no possibility of two or more of the four control rod drive mechanisms 1 which constitute the load of the same inverter power source 20 being driven simultaneously. This is achieved by the 52 inverter power units 20 being assembled with the 205 control rod drive mechanisms 1 being constituted with four mechanisms in each group. An example of the apportionment of the 205 mechanisms to the 52 inverter power sources is: 4 mechanisms×50; 3 mechanisms×1; and 2 mechanisms×1.

Figure 4:
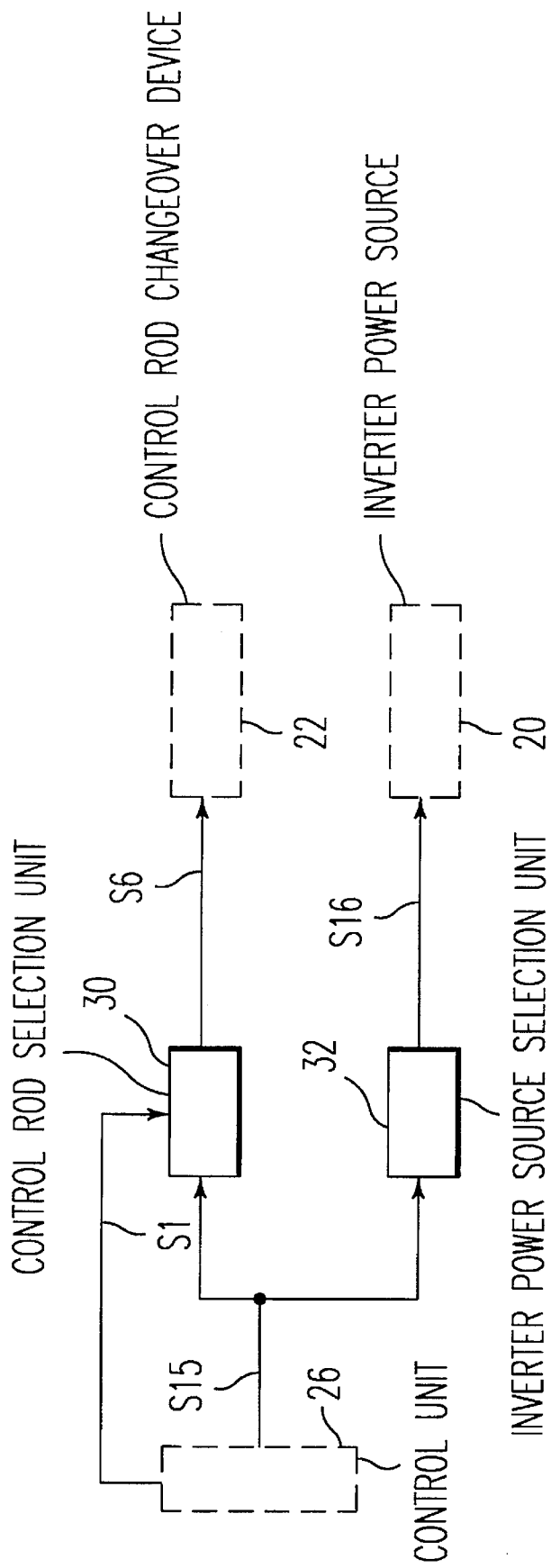
FIG. 4 is a logic diagram of the control unit under "all control rods fully inserted" conditions according to an embodiment of this invention.

When, in reactor scram, ere, an "all control rods to be fully inserted" command is output from the reactor emergency shutdown system, the control rods are temporarily separated from the electric motors of the control rod drive mechanisms 1, and are all inserted at high speed by water pressure from a separate water pressure source, not shown. Furthermore, as shown by the logic diagram of FIG. 4, control unit 26 outputs an "all control rods to be fully inserted" command signal S15, included in drive information S2, to drive control rod selection unit 30 and inverter power source selection unit 32.

Inverter power source selection unit 32 receives "all control rods to be fully inserted" command signal S15, and outputs an all-inverter drive command signal S16 to all 52 of inverter power sources 20. Also, drive control rod selection unit 30 receives "all control rods to be fully inserted" command signal S15 and closes an arbitrary one of the switches for control rod drive mechanisms 1 in control rod changeover device 22.

Thereby, 52 control rod drive mechanisms are inserted at once. After the 52 control rod drive mechanisms 1 whose switches have been closed have reached the fully inserted position, the switches of other control rod drive mechanisms 1 that have not yet been fully inserted are closed. By carrying out this operation a total of 4 times sequentially, all of the 205 control rod drive mechanisms 1 are put into the fully inserted position. Thus, the control rods are maintained in fully inserted position as a backup system of the control rods which were previously fully inserted by water pressure.

It should be noted that although an arrangement was described in which four control rod drive mechanisms 1 were driven by a single inverter power source 20 in the above embodiment, with this invention, it is possible to drive an arbitrary number N of control rod drive mechanisms with a single inverter power source 20. Thus, the number of inverter power sources 20 can be further reduced by determining the number N of control rod drive mechanisms 1 that is permitted from the relationship with the ganged mode operation of control rod drive mechanisms 1 in accordance with the operational requirements of the plant.

With this invention, in an atomic power plant equipped with control rod drive mechanisms operated by electric motor drive, the number of inverter power sources, constituting the drive power sources, that need to be provided can be greatly reduced without affecting the control rod operating performance. Thus, the noise generated by the inverter power sources can be reduced and the control equipment can be simplified, thereby also facilitating maintenance.

Numerous modifications and variations of the present invention are possible in light of the above teachings. It is therefore to be understood that, within the scope of the appended claims, the present invention can be practiced in a manner other than as specifically described herein.

What is claimed is:

1. A drive device for control rod drive mechanisms for driving control rods of an atomic power plant, each drive mechanism including an electric motor drive, the drive mechanisms being divided into a plurality of groups, the device comprising:

a control rod changeover device provided for each group of control rod drive mechanisms;

an inverter power source, associated with each said control rod changeover device, to provide a drive power source for said electric motor drives;

an inverter controller, for each said inverter power source, to output control signals for controlling said inverter power source;

a control device coupled to receive control rod position signals from each of said control rod drive mechanisms and to output control signals to each said control rod changeover device and inverter controller; and a man-machine device to interface with an operator, the man-machine device for outputting control rod drive information to said control device.

2. A drive device for control rod drive mechanisms according to claim 1, wherein in a ganged mode of operation, a selected control rod drive mechanism in each of the plurality of groups is operated;

wherein the man-machine device includes means for providing a selected mode signal to cause ganged mode operation;

the control device including:
a control rod selection unit, and
an inverter power source selection unit;

the control rod selection unit responsive to the selected mode signal to provide a control rod changeover device signal to said inverter power source selection unit and a selected one of said control rod changeover devices associated with the selected control rod drive mechanism.

3. A drive device for control rod drive mechanisms according to claim 1, wherein on full insertion of all the control rods, in the plurality of groups of control rod drive mechanisms, the control rod changeover device for each of these plurality of groups selectively couples the associated inverter power source to successive single control rod drive mechanisms.

4. A drive device for control rod drive mechanisms according to claim 1, wherein said control rods are separated from said electric motor drives and the control rods are inserted by water pressure, when reacter scram occurs.

5. A drive device for control rod drive mechanisms according to claim 1, wherein the control device includes means for operating the control rod drive mechanisms to a fully inserted position when a reactor scram occurs.

6. A drive device for control rod drive mechanisms according to claim 1, wherein said control rod changeover device is provided for each group of the control rod drive mechanisms.

7. A drive device for control rod drive mechanisms according to claim 1, wherein said control device comprises a drive control rod selection means to output control signals to said control rod changeover device.

8. A drive device for control rod drive mechanisms according to claim 1, wherein said control device comprises an inverter power source selection means to output control signals to said inverter controller.

9. A drive device for control rod drive mechanisms according to claim 8, wherein said control device comprises a control rod drive mechanism information evaluation means to output control signals to said inverter power source selection means.

10. A drive device for control rod drive mechanisms according to claim 7, wherein said man-machine device includes means to output control signals to said drive control rod selection means.

11. A drive device for control rod drive mechanisms according to claim 9, wherein said man-machine device includes means to output control signals to said control rod drive mechanism information evaluation means.

12. A drive device for control rod drive mechanisms according to claim 1, wherein said inverter power source is coupled to one of a conventional power source and a stand-by power source.

13. A drive device for control rod drive mechanisms according to claim 1, wherein said man-machine device is operated to select one of a control rod selection mode, a control rod drive mode, and a control rod insertion/withdrawal mode.

* * * * *